US008584912B2

(12) United States Patent
Nix (10) Patent No.: US 8,584,912 B2
(45) Date of Patent: Nov. 19, 2013

(54) DISCHARGER FOR DISCHARGING BULK MATERIAL THROUGH AN OPENING

(76) Inventor: Andy Nix, Oak Island, NC (US)

(*) Notice: Subject to any disclaimer, the term of this patent is extended or adjusted under 35 U.S.C. 154(b) by 139 days.

(21) Appl. No.: 13/240,638

(22) Filed: Sep. 22, 2011

(65) Prior Publication Data

US 2012/0067928 A1 Mar. 22, 2012

Related U.S. Application Data

(60) Provisional application No. 61/385,198, filed on Sep. 22, 2010.

(51) Int. Cl.
*B05B 7/00* (2006.01)

(52) U.S. Cl.
USPC .......... 222/630; 222/504; 222/559; 222/185.1

(58) Field of Classification Search
USPC ................................. 222/504, 559, 630, 185.1
See application file for complete search history.

(56) References Cited

U.S. PATENT DOCUMENTS

| | | | | |
|---|---|---|---|---|
| 3,556,469 A | * | 1/1971 | Barger | 251/144 |
| 3,578,222 A | * | 5/1971 | Pot | 222/504 |
| 3,733,012 A | * | 5/1973 | Grun | 406/133 |
| 4,067,623 A | * | 1/1978 | Klein et al. | 406/124 |
| 4,462,338 A | * | 7/1984 | Thibault | 119/53.5 |
| 4,470,524 A | * | 9/1984 | Semenenko | 222/196 |
| 4,529,085 A | * | 7/1985 | Johnson | 198/532 |
| 6,296,152 B1 | * | 10/2001 | Semenenko | 222/199 |
| 7,651,015 B2 | * | 1/2010 | Girard et al. | 222/509 |

* cited by examiner

*Primary Examiner* — Paul R Durand
*Assistant Examiner* — Donnell Long
(74) *Attorney, Agent, or Firm* — Coats and Bennett, PLLC (57) ABSTRACT

A discharge valve assembly is provided for discharging bulk material from a container having an opening formed in the lower portion thereof. The discharge valve assembly includes a discharge valve that is movable between opened and closed positions and typically disposed adjacent the opening in the container. An actuating assembly is operatively connected to the discharge valve for moving the discharge valve between open and close positions. The discharge valve includes a pair of generally flat surfaces that form at least a part of an upper portion of the discharge valve. The generally flat surfaces of the discharge valve taper generally inwardly and upwardly. Further, the pair of generally flat surfaces extend upwardly and inwardly and wherein there is formed about a top of the discharge valve a horizontal edge that extends horizontally across the discharge valve and above a substantial portion of the pair of generally flat surfaces.

17 Claims, 7 Drawing Sheets

DISCHARGER FOR DISCHARGING BULK MATERIAL THROUGH AN OPENING

CROSS REFERENCE TO RELATED APPLICATION

This application claims priority to Provisional U.S. Patent Application Ser. No. 61/385,198 filed Sep. 22, 2010. The disclosure of that application is expressly incorporated herein by reference.

FIELD OF THE INVENTION

The present invention relates to material handling and more particularly to a discharger for directing bulk material to and through an opening of a container holding the bulk material.

BACKGROUND OF THE INVENTION

Typically, the flow of bulk material downwardly through a hopper is controlled by a discharge valve disposed over an opening in a hopper, bin or other material handling structure. The discharge valve is movable between a closed position where it seats in the opening and an extended position where the discharge valve is elevated over the opening. In the open position, material flows downwardly around the discharge valve in an annulus flow configuration and through the opening in the hopper or other material handling structure.

For the most part, discharge valves of the prior art have assumed the shape of an inverted cone or have been pyrimoidal shaped. Such discharge valves have numerous drawbacks and shortcomings. In many applications employing these prior art discharge valves, the bulk material under certain conditions does not flow efficiently across the surfaces of the discharge valve. Under some circumstances a cone or pyramidal shaped discharge valve is unable to overcome the powder or bulk solids strength or consolidation to induce flow.

Therefore, there has been and continues to be a need for a discharge valve that facilitates a downward annulus flow around the discharge valve and where the upper initial contact surfaces of the discharge valve are designed to facilitate flow from hoppers, silos and other similar material storage or handling structures.

SUMMARY OF THE INVENTION

The present invention relates to a discharger having a discharge valve for controlling the flow of bulk material from a hopper, silo or other material holding structure (as well as portable hoppers and bins) where the discharge valve includes at least two flat surfaces that taper inwardly and upwardly to meet and form an upper edge. This results in the discharge valve assuming a wedge or chisel shape about the upper portion thereof.

Other objects and advantages of the present invention will become apparent and obvious from a study of the following description and the accompanying drawings which are merely illustrative of such invention.

DESCRIPTION OF EXEMPLARY EMBODIMENTS

With further reference to the drawings, a discharger is shown therein for controlling the flow of powder or bulk solids through an opening in a hopper or a container that contains the powder or bulk solids. More particularly, the discharger includes a discharge valve that is indicated generally by the numeral 10. As will be appreciated from subsequent discussions, the discharge valve 10 facilitates the flow of powder or bulk solids through an opening in a hopper or a container that contains the powder or bulk solids. In the embodiments illustrated, the upper portion of the discharge valve assumes a wedge or chisel shape. Discharge valve 10 is usually disposed over an opening such as an opening in a hopper. Typically powder or other bulk material is held within the hopper or container and extends around the discharge valve 10. Discharge valve 10, which will be discussed in more detail subsequently herein, is movably mounted for movement between a seated or closed position (FIG. 4A) in the opening to an extended or open position (FIG. 2B) above the opening. In the seated position, the discharge valve 10 effectively closes the opening in the hopper or container and prevents the flow of powder or bulk material through the opening therein. In the extended position, the discharge valve 10 rises above the opening and the opening in the hopper or the container is open such that powder and bulk material can flow around the discharge valve 10 and downwardly through the underlying opening. This gives rise to what is sometimes referred to as an annulus flow. This is because the flow pattern of the powder or bulk material assumes an annulus configuration as the powder or bulk material passes downwardly past the discharge valve 10.

The term "bulk material" is a broad term that means granular or powder material, such as for example, grains and other fine particled material of all types.

Discharge valve 10 can take on various overall shapes but the upper portion includes a wedge or chisel shape.

With particular reference to the drawings and the discharge valve 10, it is seen that the upper portion of the discharge valve includes two generally flat and planar surfaces 12 and 14. Each of the surfaces 12, 14 taper inwardly and define an upper elongated edge 16. Edge 16 extends horizontally a substantial distance across the upper extremity of the discharge valve 10. The remaining structure of the discharge valve 10, that is the structure other than the surfaces 12, 14 and edge 16, can vary.

Figure 1:
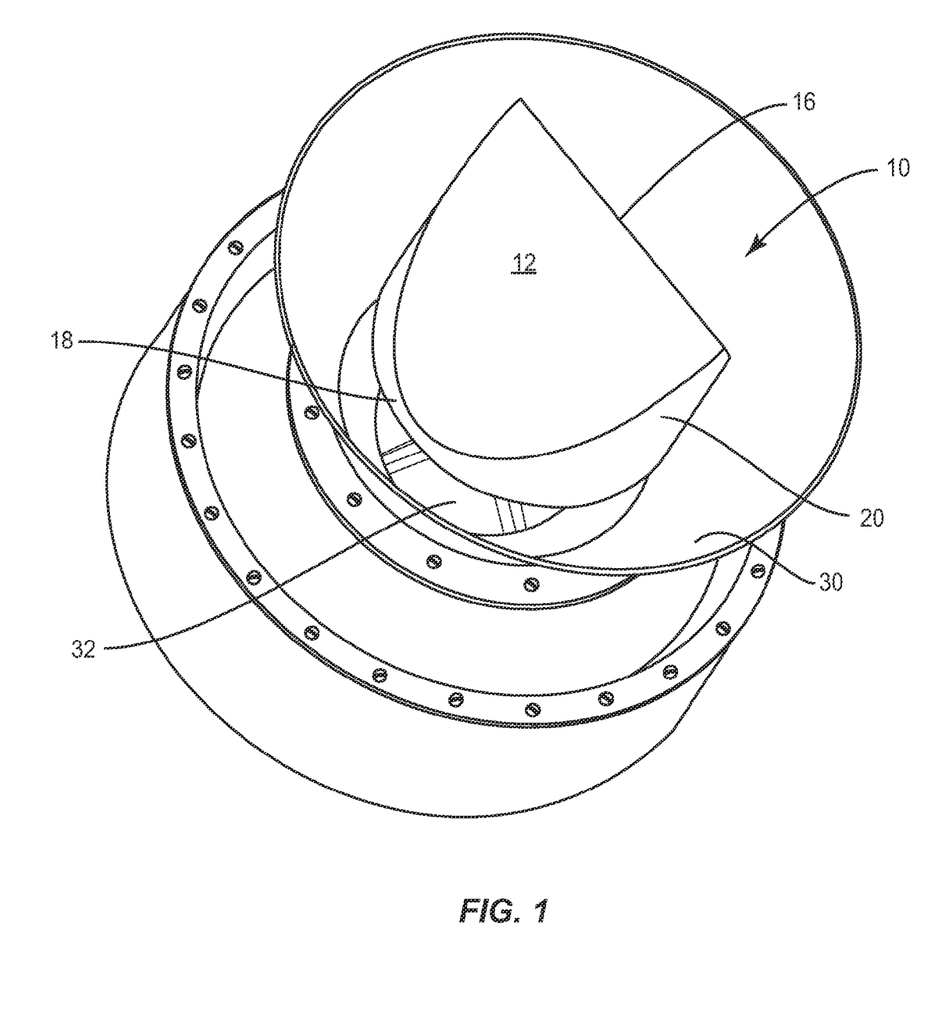
FIG. 1 is a perspective view showing the wedge or chiseled-shaped discharge valve disposed in an open position over an opening in a hopper.

In the case of a first embodiment, that is the embodiment shown in FIG. 1, the discharge valve 10 includes a round base 18. Also, the discharge valve 10 includes opposed curve sides 20 that sweep upwardly from the base 18 and join the flat surfaces 12, 14.

Figure 2:
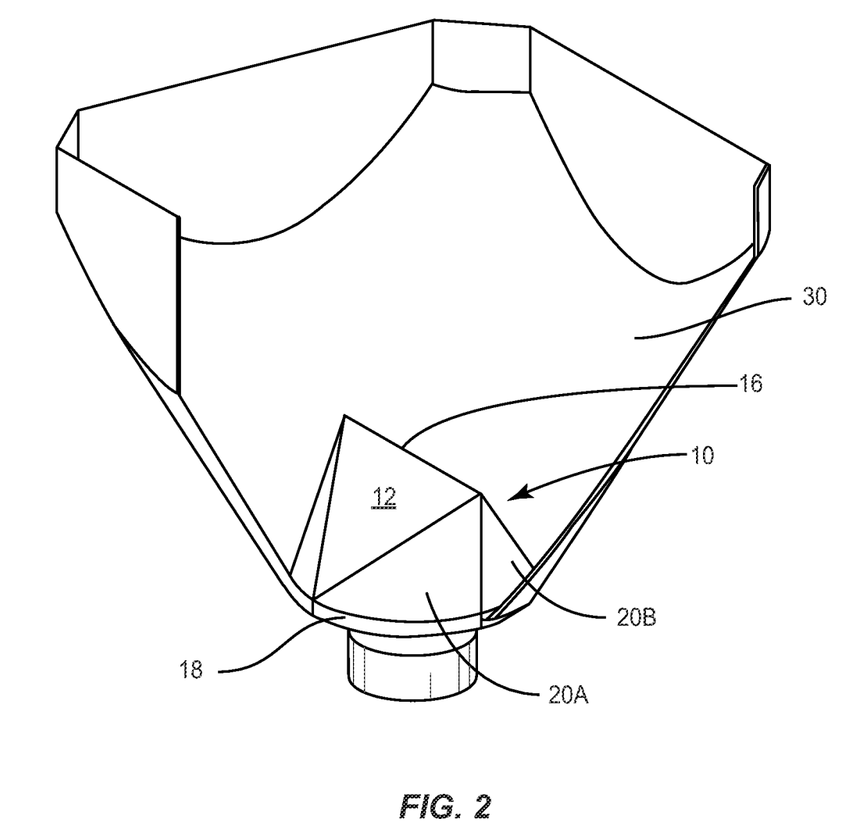
FIG. 2 is a fragmentary perspective view of an alternative design for the discharge valve, but wherein the discharge valve still includes two generally flat surfaces that taper inwardly and upwardly to form an edge.

The first embodiment shown in FIG. 1 is but one example of the overall shape of the discharge valve 10. The base could be square, rectangular or various shapes and the sides could also be of various configurations and shapes. For example, see the embodiment shown in FIG. 2. In the embodiment of FIG. 2 the discharge valve 10 still includes the wedge or chisel shape. That is, it includes the upper and inwardly tapering flat surfaces 12 and 14 that form the edge 16. However, in the case of the embodiment shown in FIG. 2, the flat surfaces 12 and 14 are generally triangular shaped. The remaining structure of the second embodiment of the discharge valve 10 shown in FIG. 2 is similar but not identical to that shown in FIG. 1. In the FIG. 2 embodiment, each side includes two different surfaces 20A and 20B.

The discharge valve 10 is typically contained within a hopper, a silo or other structure (fixed or portable) that holds bulk material or powder. In the drawings, the discharge valve 10 is shown in connection with a hopper indicated by the numeral 30. See FIGS. 4A, 4B and 4C. Again, it is appreciated that the discharge valve 10 could be utilized in many different types of structures that hold powder or other bulk material. In any event, hopper 16 includes a surrounding sidewall structure that tapers downwardly to a lower opening 32 formed in the hopper. Typically the sidewall structure of the hopper tapers inwardly and downwardly towards the opening 32 and towards the discharge valve 10 that is disposed above the opening 32. It is appreciated that when the hopper 30 is full of particles, bulk solids, powder, etc., the discharge valve 10 will project into the material within the hopper 30. Upon actuation the discharge valve 10 moves from the seated or closed position upwardly into the material. This upward movement unseats the discharge valve 10, exposing the opening 32 underneath. Then this results in a downwardly directed flow of bulk material through the hopper, around the discharge valve 10 and into and through the opening 32. As discussed above, the flow configuration will be that of an annulus flow pattern since the bulk material is constrained to flow around the discharge valve 10.

Figure 3A:
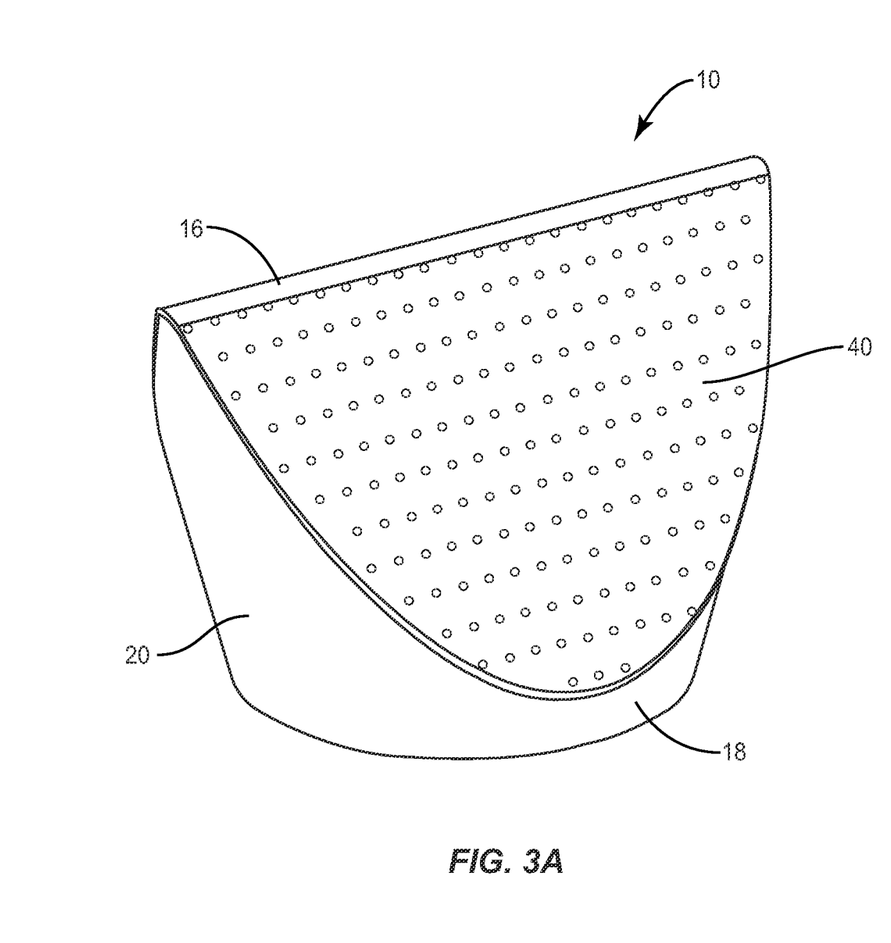
FIGS. 3A and 3B show an alternative discharge valve that includes an air plenum that extends over the wedge or chisel-shaped discharge valve.
Figure 3B:
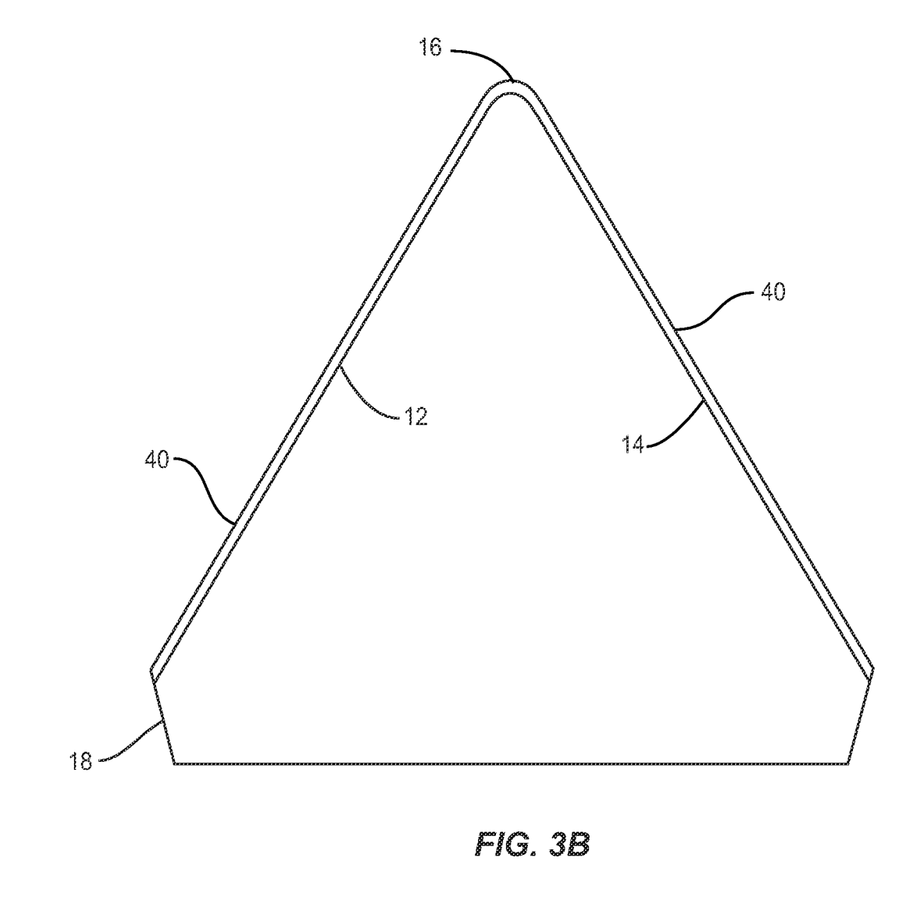

FIGS. 3A and 3B show an alternate embodiment for the discharge valve 10. Basically the discharge valve 10 assumes the same basic wedge or chisel shape as discussed above, but in this embodiment, an air plenum is formed on the wedge surfaces 12 and 14 for disbursing air outwardly from the wedge shape surfaces 12 and 14. The disbursement of air outwardly from the surfaces 12 and 14 facilitates the flow of bulk material downwardly past the discharge valve 10. With continuing reference to FIGS. 3A and 3B, disposed over each surface 12 and 14 is a plenum plate 40. The plenum plates 40 are spaced slightly above the flat surfaces 12 and 14 so as to define an air space between the surfaces 12 and 14 and the plenum plates. The plenum plates includes an array of openings formed therein that permits air to be forced through the plenum space and outwardly through the various openings in the plenum plates, The formed air plenum is operatively connected to a source of compressed air. Although not shown, the source of compressed air would be operatively connected to one or more air conduits that extend from the compressed air source through the main body of the discharge valve 10 and ultimately to the air plenum. This would enable air to flow under pressure from the compressed air source, through the air conduits, through the main body of the discharge valve 10 into the air plenum defined between the flat surfaces 12 and 14 and the plenum plates 40. Various conventional controls can be provided for actuating the air supply and even controlling the air pressure or air flow exhausted from the air plenum.

The air plenum discussed above facilitates the movement of material across the upper surfaces of the discharge valve 10. This makes it less likely that material would not freely flow across the surfaces of the discharge valve 10. The air prevents material from lodging or simply remaining on the upper portion of the discharge valve 10. That is, the air being exhausted through the plenum plates 40 actively induces the material to flow downwardly and around the discharge valve 10.

The discharge valve 10 discussed above has many and varied applications. For example, the discharge valve 10 can be used in agricultural, pharmaceutical and biotechnical applications as well as any applications where one is faced with dispensing powder or bulk material such as grain, particles, powder, etc.

Figure 4A:
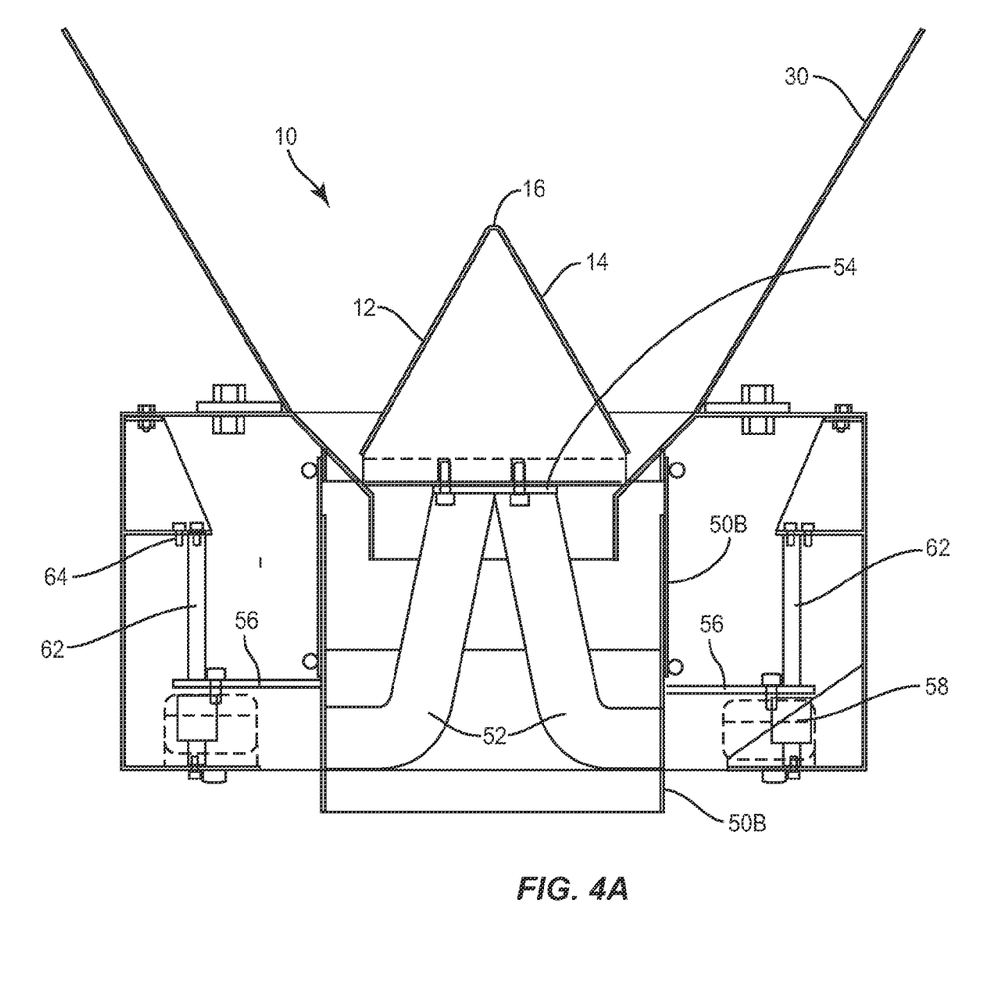
FIGS. 4A, 4B and 4C show the discharger and discharge valve of the present invention disposed within a hopper and FIGS. 4A and 4B specifically show one type of actuator that can be employed to move the discharge valve between open and close positions.
Figure 4B:
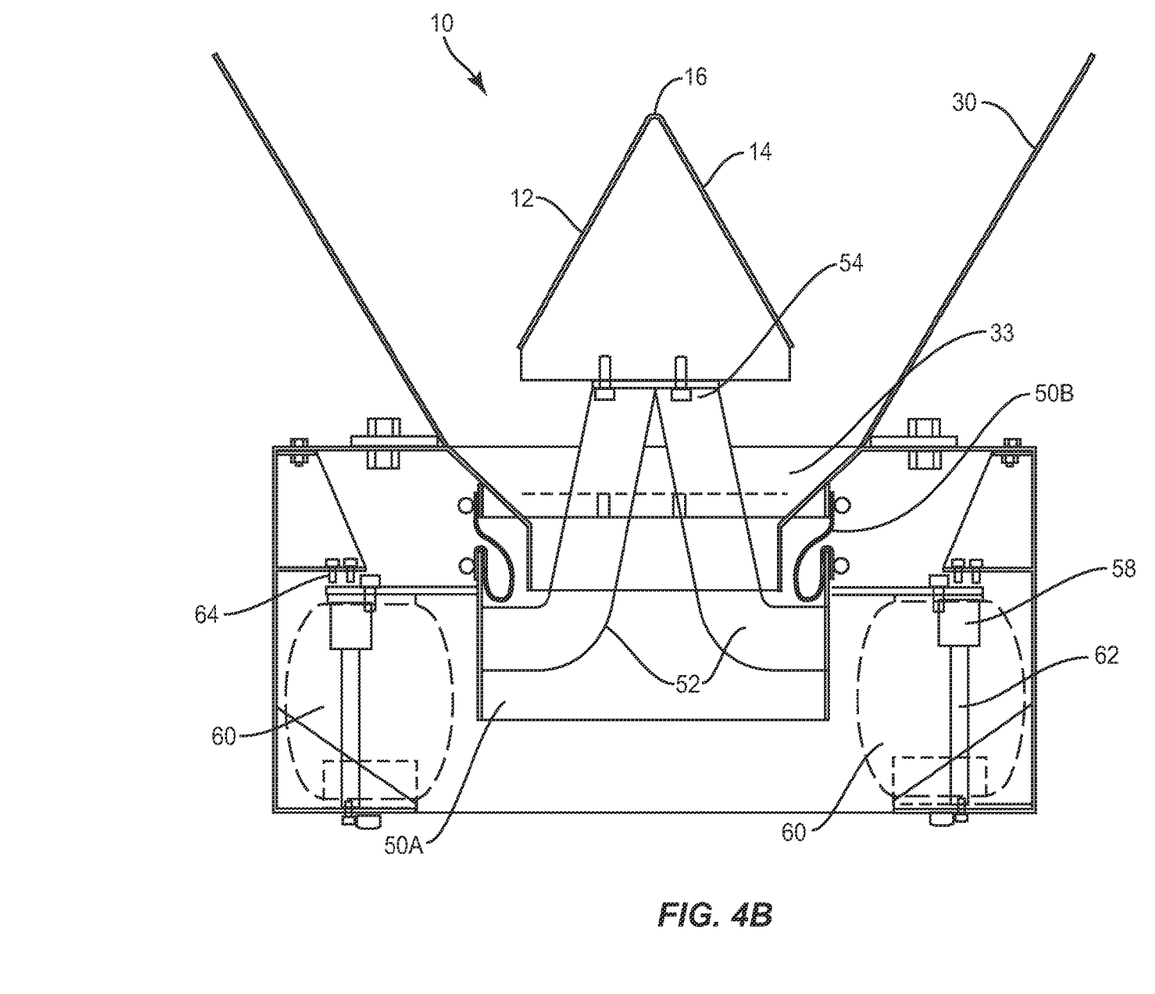
Figure 4C:
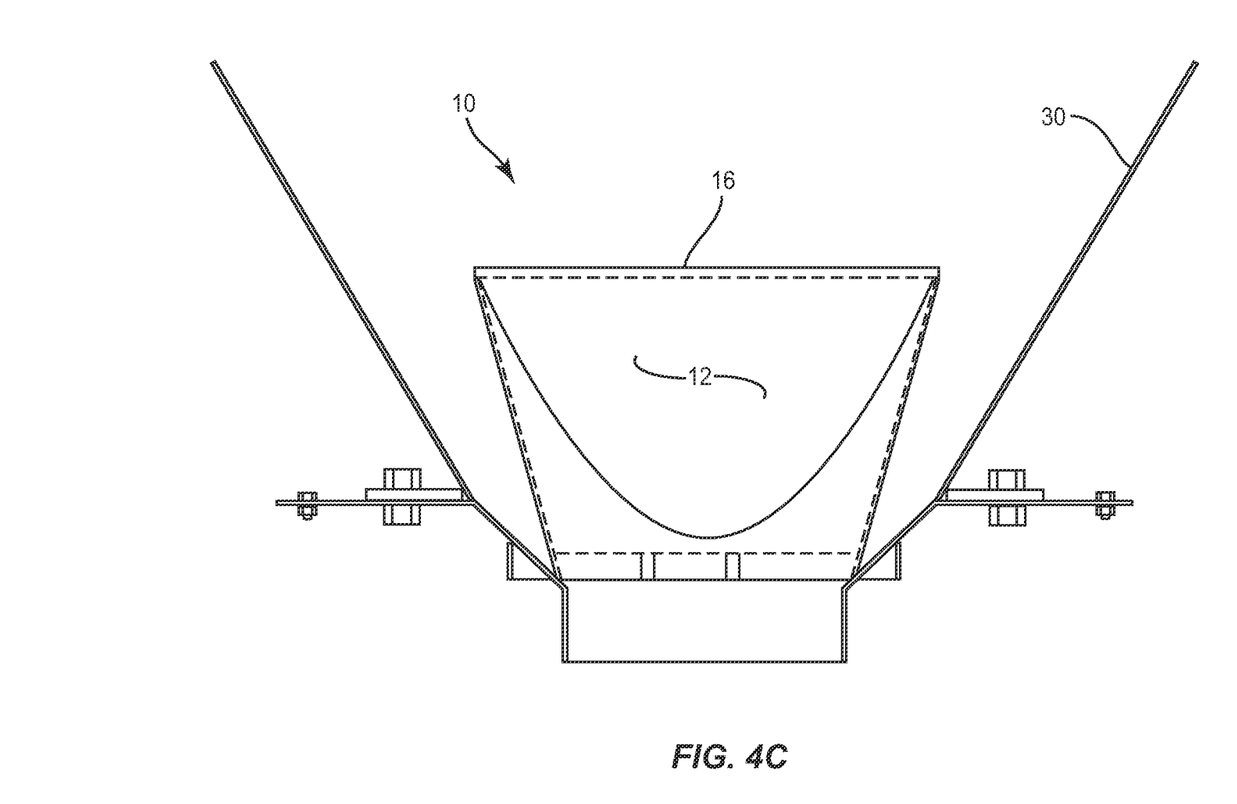

Attention is now directed to FIGS. 4A, 4B and 4C. This discloses one exemplary actuation system for moving the discharge valve 10 up and down with respect to the underlying opening 32 in the hopper 30. Note in FIG. 4A, that the discharge valve 10 is seated in the opening 32 of the hopper 30 and is therefore disposed in a closed position. FIG. 4B shows the discharge valve 10 in an open position. Here the discharge valve 10 is elevated with respect to the opening 32 in the hopper 30 so as to permit the flow of bulk material to flow downwardly past the discharge valve 10 into and through the opening 32.

There are various ways to actuate and move the discharge valve 10 between closed and open positions. The actuating mechanism shown in FIGS. 4A and 4B is but one example of a suitable type activating mechanism.

With reference to FIG. 4A and 4B, there is provided a transfer hopper or chute that is suspended from the hopper 30. Note that the transfer hopper or chute includes two portions, a rigid lower section 50A and a flexible upper section 50B. Note in FIG. 4A where the upper section 50B is extended and the transfer hopper is relatively deep. FIG. 4B illustrates the lower section 50A being raised and in the process the flexible upper section of 50B tends to curl and includes some general overlapment.

A support structure for supporting the discharge valve 10 is contained within the transfer hopper 50A, 50B. This structure in this example includes three gussets 52. Each gusset 52 is welded or secured by suitable means to the inner wall of the lower section 50A of the transfer hopper. Each gusset 52 extends inwardly and upwardly. A support plate 54 is secured to the top of the gussets 52. The discharge valve 10 is in turn secured to the support plate 54 by a series of bolts.

Extending outwardly from the outer wall of the lower section 50A of the transfer hopper is a series of uniformly spaced plates 56. Associated with each plate is a bushing 58. There is provided a series of pneumatic bladders that underlie the respective plates 56 and which rest on a surrounding frame structure. Plates 56 in turn rest on the pneumatic bladders 60. The bushings 58 are mounted on vertical guide rods 62. The vertical guide rods 62 form a part of the surrounding frame structure. Thus it follows as the pneumatic bladders 60 are inflated, the plates 56 along with the bushings 58 move upwardly. The bushings 58 surrounding the vertical guide rods 62 and maintain the transfer hopper and discharge valve 10 in proper alignment with respect to the opening 32 in the hopper 30. There is also provided on the surrounding frame structure a series of nylon bumper stops 64. These stops may typically engage the plates 56 when the pneumatic bladders 60 are actuated, effectively limiting the vertical movement of the plates 56 and the discharge valve 10.

In operation, the discharge valve 10 normally assumes the closed position shown in FIG. 4A. In this case, the discharge valve 10 seats in the opening of the hopper 30 and prevents bulk material flow from flowing downwardly through the lower opening in the hopper. To actuate the discharge valve 10 the pneumatic bladders 60 are inflated by well known conventional means. This causes the transfer hopper to move from the position shown in FIG. 4A to the position shown in FIG. 4B. This effectively opens the opening 32 within the hopper 30. See FIG. 4B. Now the bulk material or powder disposed within the hopper can flow downwardly past the discharge valve 10 into and through the underlying opening 32 in the hopper 30. Because of the particular shape of the upper portion of the discharge valve 10, the flow of powder, bulk material or other particles is greatly facilitated.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A system for handling and discharging bulk material, comprising:
   a. a container for containing bulk material;
   b. an opening formed in a lower portion of the container for permitting the bulk material to flow there through;
   c. a discharge valve mounted adjacent the opening formed in the container and movable between a lower first position where the discharge valve closes the opening and an upper second position where the discharge valve is positioned such that the opening formed in the container is open;
   d. wherein in the upper second position, the discharge valve permits the bulk material to flow downwardly and around the discharge valve in an annulus flow pattern, and through the opening in the container; and
   e. the discharge valve including:
      i. a pair of generally flat surfaces that form at least a part of an upper portion of the discharge valve;
      ii. the pair of generally flat surfaces of the discharge valve tapering generally inwardly and upwardly;
      iii. wherein the pair of generally flat surfaces meet at a top of the discharge valve to form an edge that extends horizontally across the top of the discharge valve; and
      iv. a round base and opposed sides that curve upwardly from the base and join the flat surfaces.

2. The system of claim 1 wherein the pair of flat sides and edge combine to cause the discharge valve to have a chiseled shape about the upper portion thereof.

3. The system of claim 1 including a transfer conduit generally aligned with the discharge valve and disposed generally below the opening in the container such that bulk material passing through the opening in the container flows into and through the transfer conduit.

4. The system of claim 3 wherein the transfer conduit is operatively connected to the discharge valve and at least a portion of the transfer conduit moves with the discharge valve as the discharge valve is moved between the first and second positions.

5. The system of claim 4 wherein the transfer conduit includes first and second sections and wherein at least one of the sections is a flexible and is configured to assume at least a partial curl configuration in response to the discharge valve moving from the first position to the second position.

6. The system of claim 1 including one or more pneumatic bladders for actuating the discharge valve and causing the discharge valve to move from the first position to the second position.

7. The system of claim 1 wherein the discharge valve includes an air plenum disposed adjacent the flat tapering surfaces of the discharge valve for dispersing air from the discharge valve and facilitating the flow of bulk material downwardly past the discharge valve when the discharge valve is in the second position.

8. The system of claim 3 further including:
   a. a support structure operatively interconnected between the transfer conduit and the discharge valve such that movement of the transfer conduit results in the discharge valve being moved; and
   b. an actuating structure operatively connected to the transfer conduit for moving the transfer conduit up and down and at the same time, moving the discharge valve back and forth between the first and second positions.

9. The system of claim 8 wherein the actuating structure includes a plurality of guide assemblies for guiding the transfer conduit up and down and generally maintaining the discharge valve in alignment with the opening of the container.

10. A system for discharging bulk material from a container having an opening formed in a lower portion of the container, the system comprising:
    a. a discharge valve configured to be movably mounted adjacent the opening in the container;
    b. an actuating assembly operatively connected to the discharge valve for moving the discharge valve between open and closed positions; and
    c. the discharge valve including:
       i. a pair of generally flat surfaces that form at least a part of an upper portion of the discharge valve;
       ii. the pair of generally flat surfaces of the discharge valve tapering generally inwardly and upwardly;
       iii. wherein the pair of generally flat surfaces extend generally upwardly and inwardly and wherein there is formed about a top of the discharge valve a horizontal edge that extends horizontally across the top of the discharge valve and above a substantial portion of the pair of generally flat surfaces; and
       iv. a base and a pair of opposed curved sides that curve and extend upwardly from the base and join the flat surfaces.

11. The system of claim 10 wherein the system is pneumatically actuated and wherein the actuating assembly includes one or more pneumatic bladders that are operative to move the discharge valve between the open and close positions.

12. The system of claim 11 further including a transfer conduit aligned with the discharge valve and wherein a substantial portion of the transfer conduit is disposed below the discharge valve; and wherein there is provided a support structure extending between the transfer conduit and the discharge valve that interconnects the discharge valve with the transfer conduit and wherein the transfer conduit is movable upwardly and downwardly between two positions and wherein the discharge valve is operative to move between opened and closed positions as the transfer conduit moves.

13. The system of claim 12 wherein the actuating assembly is operatively connected to the transfer conduit and is operative to move the transfer conduit vertically between upper and lower positions.

14. The system of claim 12 wherein the transfer conduit includes two sections and wherein one of these sections is constructed of flexible material that enables the section to assume at least a partially curled position in response to selective movement of the transfer conduit.

15. The system of claim 10 wherein the actuating assembly includes a series of guides disposed outwardly of the discharge valve for guiding the discharge valve as the discharge valve moves between opened and closed positions.

16. The system of claim 15 further including a transfer conduit aligned with the discharge valve and wherein a substantial portion of the transfer conduit is disposed below the discharge valve; and wherein there is provided a support structure extending between the transfer conduit and the discharge valve that connects the discharge valve with the transfer conduit and wherein the transfer conduit is movable upwardly and downwardly between two positions and wherein the discharge valve is operative to move between the open and close positions as the transfer conduit moves.

17. The system of claim 10 wherein the discharge valve includes an air plenum disposed adjacent the flat tapering surfaces of the discharge valve for dispersing air from the discharge valve and facilitating the flow of bulk material downwardly past the discharge valve.

* * * * *